United States Patent
Gu et al.

(10) Patent No.: US 11,008,423 B2
(45) Date of Patent: May 18, 2021

(54) MODIFIED BISMALEIMIDE RESIN AND PREPARATION METHOD THEREOF

(71) Applicant: SOOCHOW UNIVERSITY, Suzhou (CN)

(72) Inventors: Aijuan Gu, Suzhou (CN); Jiatao Miao, Suzhou (CN); Guozheng Liang, Suzhou (CN); Li Yuan, Suzhou (CN)

(73) Assignee: SOOCHOW UNIVERSITY, Suzhou (CN)

( * ) Notice: Subject to any disclaimer, the term of this patent is extended or adjusted under 35 U.S.C. 154(b) by 253 days.

(21) Appl. No.: 16/466,111

(22) PCT Filed: Dec. 3, 2016

(86) PCT No.: PCT/CN2016/108470
§ 371 (c)(1),
(2) Date: Jun. 3, 2019

(87) PCT Pub. No.: WO2018/098832
PCT Pub. Date: Jun. 7, 2018

(65) Prior Publication Data
US 2020/0062903 A1   Feb. 27, 2020

(51) Int. Cl.
*C08G 73/10* (2006.01)
*C08G 73/12* (2006.01)

(52) U.S. Cl.
CPC ......... *C08G 73/1028* (2013.01); *C08G 73/10* (2013.01); *C08G 73/12* (2013.01)

(58) Field of Classification Search
CPC .................. C08G 73/12; C08G 73/10
See application file for complete search history.

(56) References Cited

U.S. PATENT DOCUMENTS

| | | | |
|---|---|---|---|
| 4,812,511 A | 3/1989 | Domeier | |
| 6,359,039 B1 | 3/2002 | Chen et al. | |
| 2011/0147646 A1 | 6/2011 | Tseng et al. | |
| 2014/0005353 A1* | 1/2014 | Yutaka | C08G 69/40 528/341 |

FOREIGN PATENT DOCUMENTS

| | | |
|---|---|---|
| CN | 101845143 A | 9/2010 |
| CN | 105801843 A | 7/2016 |
| JP | 2009298753 | * 12/2009 |

OTHER PUBLICATIONS

Shibata et al (Bio-based thermosetting bismaleimide resins using eugenol, Reative and difunctional polymers, 73(2013), 1086-1095), published on Oct. 2013.*
USPTO structure search, published on Apr. 2021.*

* cited by examiner

*Primary Examiner* — Gregory Listvoyb
(74) *Attorney, Agent, or Firm* — SZDC Law P.C.

(57) ABSTRACT

The present invention discloses a modified bismaleimide resin and preparation method thereof; under conditions of N,N-dimethylformamide serving as a catalyst, biomass-based 2,5-furandicarboxylic acid and thionyl chloride are acylated to obtain 2,5-furan diformyl chloride, which is then dissolved in dichloromethane with a biomass-based eugenol; under tertiary amine conditions an esterification reaction takes place, and a fully biomass-based bis(4-allyl-2-methoxyphenyl)furan-2,5-dicarboxylic acid ester is thus obtained; same is used for preparing a modified bismaleimide resin. The bismaleimide resin prepared by the present invention has excellent thermal properties and rigidity; the preparation method uses 2,5-furandicarboxylic acid from biomass as well as eugenol; the raw materials are green and environmentally friendly and renewable; the invention also has the feature of a simple production process, and has broad prospects for application in such fields as aeronautics and astronautics, electronic information, electrical insulation.

4 Claims, 4 Drawing Sheets

MODIFIED BISMALEIMIDE RESIN AND PREPARATION METHOD THEREOF

This application is the National Stage Application of PCT/CN2016/108470, filed on Dec. 3, 2016.

FIELD OF THE INVENTION

The present invention relates to a modified bismaleimide resin and its preparation method, in particular to a bismaleimide resin modified by bis(4-allyl-2-methoxyphenyl)-furan-2,5-dicarboxylate based on green and renewable biomass resources. It belongs to technical fields of chemical engineering and polymer materials.

BACKGROUND OF THE INVENTION

In the past few decades, petroleum and coal are important raw materials for producing fuels, chemicals and polymer materials. However, the non-renewability of petroleum and coal resources and the urgency of sustainable human development require the development of a new type of renewable material, while biomass material just meets the urgent needs of mankind.

Biomass is characterized by its renewability, wide distribution and large annual production, but its utilization efficiency has so far been very low. How to efficiently convert renewable biomass resources into usable polymer materials has aroused the interest of the whole world and received great attention. Most of the biomass materials widely existed in nature is aliphatic compounds, which have poor thermal properties. Therefore, eugenol and 2,5-furandicarboxylic acid stand out with excellent thermal stability of their aromatic structure. Eugenol, accounting for about 80% of clove oil, is a renewable, low-toxic, relatively low-cost (about $5 per kilogram) biomass material. 2,5-furandicarboxylic acid is listed in the top ten green chemicals by U.S. Department of Energy and has been used in the synthesis of nylon, polyester and polyurethane and the like. However, under the requirements of scientific and technological progress and economic development, it has been extensively studied in recent years because high-performance resin may be applied to high-end fields with its excellent performance, but the use of 2,5-furandicarboxylic acid and eugenol in high performance resin is little.

As a representative high performance thermosetting resin, bismaleimide (BMI) resin has outstanding integrated performance including outstanding thermal oxidation resistance, heat resistance, mechanical properties, good hot/wet resistance and excellent dielectric properties, etc, so BMI resin plays an important role in aerospace, electronic information, electrical insulation and other high-end areas. Unfortunately, BMI resin without modification has some shortcomings such as high melting point, poor solubility, high molding temperature as well as high crosslinking density and big brittleness of cured BMI resin, and thus cannot meet the requirements of processing and service. Up-to-date, the most mature and effective modification technology of BMI resin is using allyl phenyl compounds as modifiers; this technology is a hot research area of BMI modification in the whole world, and the researches are mainly focused on N,N'-(4,4'-methylenediphenyl) dimaleimide (BDM). 2,2'-Diallyl bisphenol A (DBA) is the mostly often used allyl phenyl compound modifier for BDM. However, DBA is made from diallyl bisphenol A ether (BBE) through Claisen rearrangement, while BBE is predominantly synthesized by the reaction between bisphenol A and chloropropene or bromopropylene, and all of them are derived from petroleum and coal resources. On one hand, bisphenol A is completely dependent on petroleum and coal resources, which is the largely used for modifying BDM resin, so this fact does not match with the concept of green and sustainable development. On the other hand, with the improvement of quality of life, there is a growing demand for health and safety in production and daily life; however, bisphenol A brings a great threat to people's health because it has similar structure with estrogen, and thus making the growing demand for bisphenol A-free products. Therefore, developing an environmentally friendly and green biomass-based BMI modifier with low toxicity is greatly important for resource protection and human health.

Recently, some literature reported the modification of BMI by biomass-based allyl phenyl compounds, however, most of them are not prepared by full biomass. 5,5'-Bieugenol (BEG) is the only fully biomass-based allyl phenyl compound that is used to modify BMI (Ref: Mitsuhiro Shibata, Naozumi Tetramoto, Ayumi Imada, Makiyo Neda, Shimon Sugimoto. Reactive & Functional Polymers, 2013, 73, 1086-1095), but the conversion rate of BEG is only 60%, in addition, the modified BDM resin does not simultaneously have high flexural modulus, glass transition temperature ($T_g$) and initial thermal decomposition temperature ($T_{di}$). When the mole ratio of BEG to BDM is 0.5:1, the $T_g$ and $T_{di}$ value of modified resin are 285.8° C. and 423.1° C., respectively, while the flexural modulus of the modified resin is as low as 2.7 GPa; when the mole ratio of BEG to BDM is 1:1, the $T_g$ and $T_{di}$ value of modified resin are only 201.2° C. and 419.0° C., respectively, and the flexural modulus of the modified resin is lower than 1 GPa. These thermal properties and flexural modulus of the modified resins are worse than those of BMI resins modified by DBA based on petroleum and coal resources. The reason is that BEG is obtained by direct connection of two molecules of eugenol, and then the molecular structure of BEG shows a biphenyl structure that has a large steric resistance, so the Diels-Alder addition reaction between BDM and double bond of intermediate is difficult to take place, and the cured resin has degraded thermal properties and flexural modulus due to reduced crosslinking density.

Therefore, it is an interesting and valuable project to prepare a fully biomass-based allyl phenyl compound for modifying BMI and endow the modified BMI resin with good thermal performance and high flexural modulus.

SUMMARY OF THE INVENTION

Directed to the deficiencies of the prior art, the present invention provides a modified bismaleimide resins with good thermal performance as well as high flexural modulus and a preparation method thereof.

In order to achieve above purpose, the technical solution adopted by this invention is, A preparation method of modified bismaleimide resin, comprising the following steps:

(1) by mole, mixing 100 parts of 2,5-furandicarboxylic acid, 150 to 250 parts of thionyl chloride and a catalytic amount of N,N-dimethylformamide and stirring to react at a temperature of 70 to 80° C. for 3 to 5 h, naturally cooling to room temperature, removing thionyl chloride by vacuum distillation, after drying to obtain 2,5 furodicarboxylic acid chloride;

(2) by mole, dissolving 190 to 210 parts of eugenol and 240 to 300 parts of tertiary amine in 3120 to 7800 parts of dichloromethane to obtain eugenol solution A; at a temperature of −5 to 0° C., under stirring, dissolving 100 parts of 2,5-furan dicarboxylic acid chloride in 3120 to 7800 parts of dichloromethane to obtain solution B, then adding solution B dropwise in said eugenol solution A, after completion of dropwise addition, heating the reaction solution slowly to the temperature of 20 to 30° C., and continuing the reaction for 2 to 4 h; and then removing dichloromethane under vacuum rotary evaporation, washing and drying to obtain fully biomass-based bis(4-allyl-2-methoxyphenyl)furan-2,5-dicarboxylate;

(3) by mole, at 20 to 30° C., mixing 1 part of bismaleimide with 0.55 to 1.20 parts of bis(4-allyl-2-methoxyphenyl)furan-2,5-dicarboxylate, stirring at the temperature of 130 to 145° C. to get transparent liquid, then after curing and post-treatment to obtain a modified bismaleimide resin.

In the present invention, said tertiary amine is one of triethylamine, N-ethyl diisopropylamine, pyridine, or any combination thereof.

In the present invention, said bismaleimide is one of N,N'-(4,4'-methylenediphenyl) dimaleimide, N,N'-(4,4'-diphenyl ether) dimaleimide, or any combination thereof.

The present invention also discloses a modified bismaleimide resin obtained by above preparation method.

Different from available modified bismaleimide resins provided by existing art, this invention provides a kind of modified bismaleimide resins with good thermal performance and high flexural modulus. The mechanism behind is that the fully biomass-based bis(4-allyl-2-methoxyphenyl)furan-2,5-dicarboxylate provided by this invention has a special structure; for one hand, aromatic structures of eugenol and 2,5-furandicarboxylic acid endow the fully biomass-based bis(4-allyl-2-methoxyphenyl)furan-2,5-dicarboxylate with excellent thermal stability, and thus meeting the requirement of modifying BMI resin; on the other hand, the allyl groups of bis(4-allyl-2-methoxyphenyl)furan-2,5-dicarboxylate present at the para-position of the chemical structure, showing small steric hindrance, this is beneficial for the progress of Diels-Alder addition reaction between BDM and double bond of intermediate, so the modified BMI resins have high reactivity and the cured resins exhibit high crosslinking density, therefore, the modified BMI resins have good thermal performance and high flexural modulus.

Compared with the prior arts, this invention has following advantages:

1. In this invention, renewable biomass-based eugenol and 2,5-furandicarboxylic acid are taken as raw materials; the biomass content of resultant bis(4-allyl-2-methoxyphenyl)furan-2,5-dicarboxylate prepared is as high as 100% and the conversion rate of the synthesis is over 90%; when bis(4-allyl-2-methoxyphenyl)furan-2,5-dicarboxylate is used to modify bismaleimide resin, the modified bismaleimide resin has better reactivity and the cured resin has high crosslinking density; so the modified bismaleimide resin has good thermal performance and high rigidity.

2. Compared with the synthetic process of traditional petroleum-based diallyl bisphenol A, the synthesis of fully biomass-based bis(4-allyl-2-methoxyphenyl)furan-2,5-dicarboxylate provided by this invention does not need rearrangement process at high temperature, so the synthesis method is simple and energy saving.

3. Different from the existing art, modified bismaleimide resins provided in this invention are bisphenol A-free materials, so there are no risks for reduced fertility as well as developing diseases and cancers.

4. The preparing process of modified bismaleimide resins provided by this invention is simple, controllable and easy to be industrialized.

DETAILED DESCRIPTION OF THE INVENTION

The technical solution of this invention will be further described below with the accompanying figures and examples.

Example 1

1) Synthesis of 2,5-furan Dicarboxylic Acid Chloride

Figure 1:
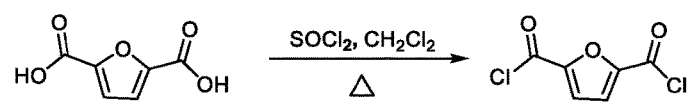
FIG. 1 is synthesis of 2,5-furan dicarboxylic acid chloride.

As is shown in FIG. 1, it is the synthesis reaction formula of 2,5-furan dicarboxylic acid chloride of this invention; the specific method is described as following:

31.20 g 2,5-furandicarboxylic acid, 35.69 g thionyl chloride and N,N-dimethylformamide (DMF, catalyst) are mixed; the reaction is carried out for 3 h at 80° C. with stirring, and then the mixture is naturally cooled to room temperature. After removing the thionyl chloride under reduced pressure and drying, 2,5-furan dicarboxylic acid chloride is obtained, its yield is 99.5%.

Figure 2:
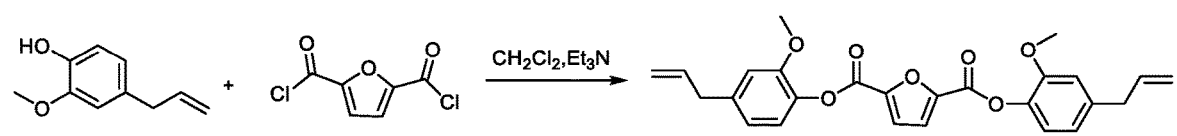
FIG. 2 is synthesis of fully biomass-based bis(4-allyl-2-methoxyphenyl)-furan-2,5-dicarboxylate.

2) Synthesis of Fully Biomass-based bis(4-allyl-2-methoxyphenyl)furan-2,5-dicarboxylate As is shown in FIG. 2, it is the synthesis reaction formula of fully biomass-based bis(4-allyl-2-methoxyphenyl)furan-2,5-dicarboxylate of this invention; the specific method is described as follows:

31.20 g eugenol and 24.29 g triethylamine acting as base are dissolved in 200 mL dichloromethane; at the temperature ranging from −5 to 0° C., 2,5-furan dicarboxylic acid chloride (19.30 g) is dissolved in 200 mL dichloromethane solution to get 2,5-furan dicarboxylic acid chloride solution, which is then slowly dropped into the solution of eugenol A; After dropwise addition is completed, the reaction solution is slowly raised and maintained at 20° C. for 2 h; after the reaction is over, removing the solvent under reduced pressure, followed by washing with deionized water and drying, successively, a fully biomass-based bis(4-allyl-2-methoxyphenyl)furan-2,5-dicarboxylate is obtained, of which the yield is 91.2%.

Figure 3:
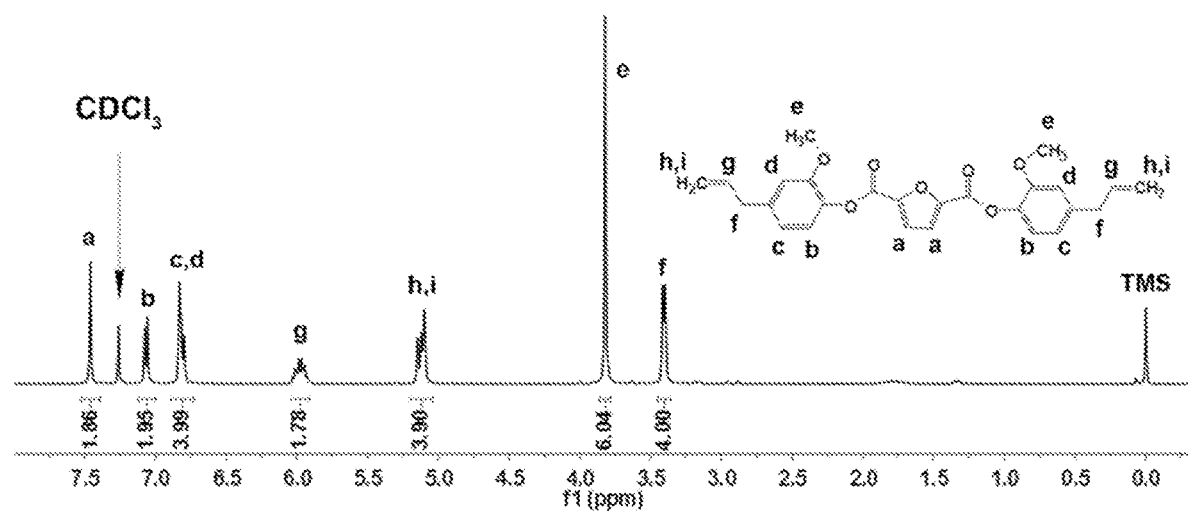
FIG. 3 is the $^1$H-NMR spectrum of fully biomass-based bis(4-allyl-2-methoxyphenyl)-furan-2,5-dicarboxylate prepared in Example 1 of this invention.
Figure 4:
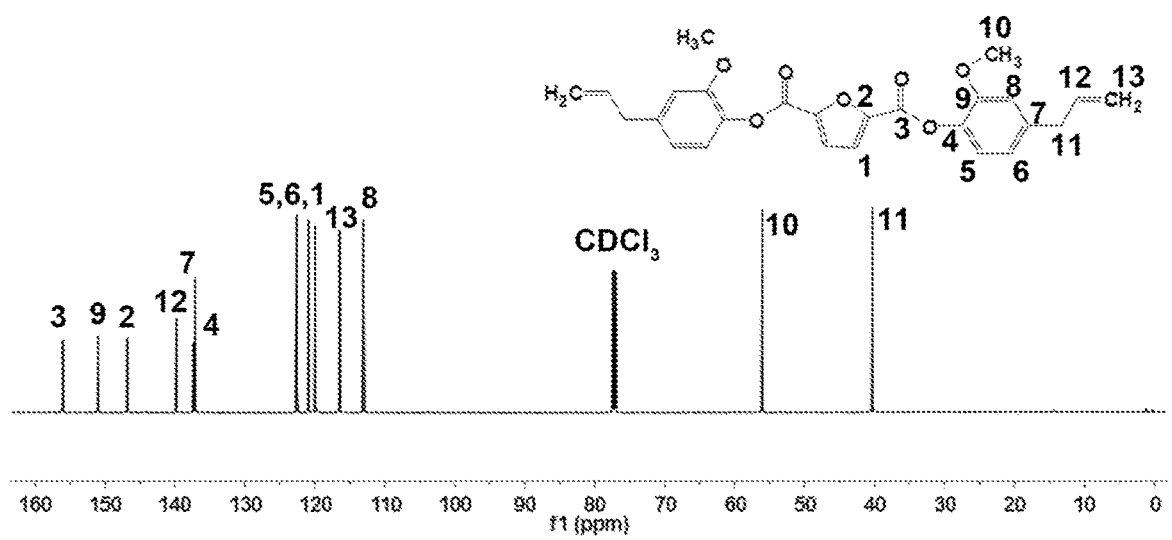
FIG. 4 is the $^{13}$C-NMR spectrum of fully biomass-based bis(4-allyl-2-methoxyphenyl)-furan-2,5-dicarboxylate prepared in Example 1 of this invention.
Figure 5:
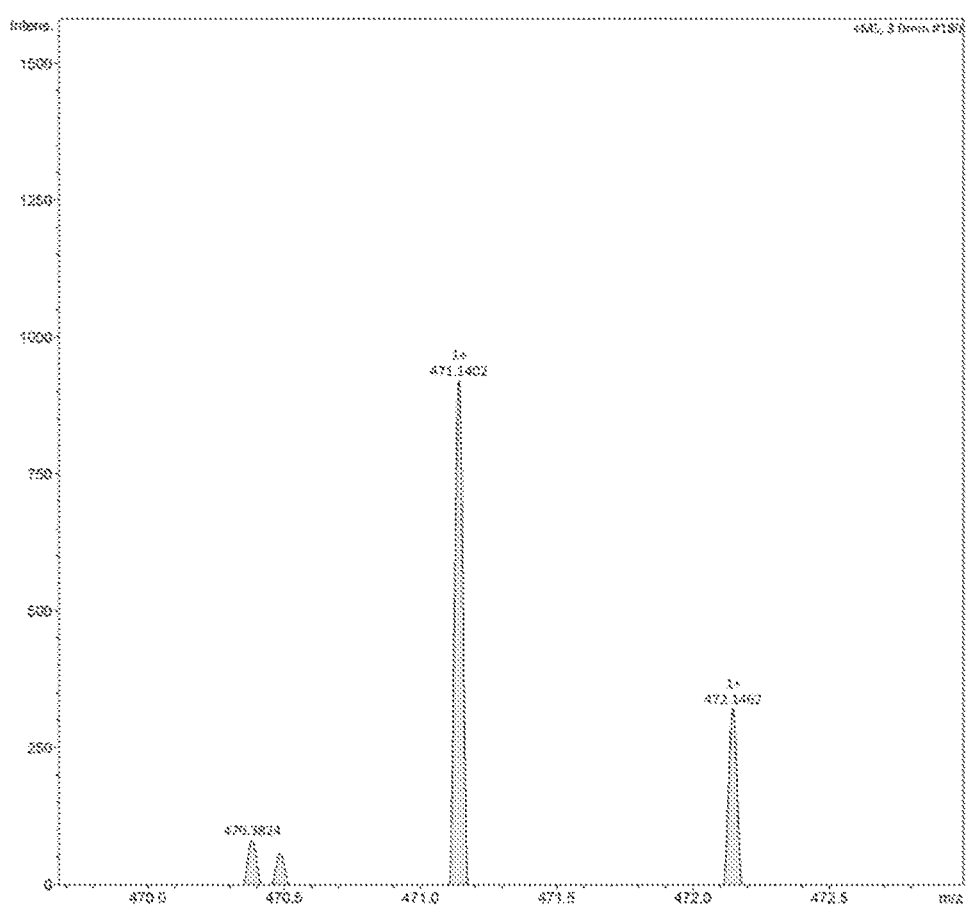
FIG. 5 is high resolution mass spectrum of fully biomass-based bis(4-allyl-2-methoxy-phenyl)furan-2,5-dicarboxylate prepared in Example 1 of this invention.

The $^1$H-NMR, $^{13}$C-NMR and high resolution mass spectra of the fully biomass-based bis(4-allyl-2-methoxyphenyl)furan-2,5-dicarboxylate obtained in this example are shown in FIGS. 3, 4 and 5, respectively.

3) Preparation of Modified Bismaleimide Resin

At 20° C., 50.0 g (139.5 mmol) N,N'-(4,4'-methylenediphenyl) dimaleimide and 35.5 g (76.73 mmol) fully biomass-based bis(4-allyl-2-methoxyphenyl)furan-2,5-dicarboxylate are mixed, the mixture is stirred for 30 min at constant temperature condition (130° C.); the prepolymer is poured into a preheated glass mold and degassed under vacuum at 145° C. for 30 min; after that, the mold is put into an oven for curing and post-curing using the procedure of 150° C./2 h+180° C./2 h+200° C./2 h and 220° C./8 h, successively; after natural cooling to room temperature, a modified bismaleimide resin is obtained.

As shown in FIG. 1, the synthesis of 2,5-furan dicarboxylic acid chloride in Example 1 is a carboxylic acid acyl chloride reaction. As shown in FIG. 2, the synthesis of fully biomass-based bis(4-allyl-2-methoxyphenyl)furan-2,5-dicarboxylate in Example 1 is an esterification reaction.

FIG. 3 shows the $^1$H-NMR spectrum of fully biomass-based bis(4-allyl-2-methoxy-phenyl)furan-2,5-dicarboxylate obtained in Example 1 of this invention. It can be seen that the peaks at 5.98 ppm and 5.04~5.20 ppm represent protons of allyl groups, the peak at 3.40 ppm represents the proton of methylene groups adjacent to the double bond of allyl groups, the peak at 3.82 ppm represents the proton of methoxy groups, the peak at 7.43 ppm represents the proton of furan rings, Other peaks match with the chemical shifts of protons of the biomass-based allyl compound.

As shown in FIG. 4, it is the $^{13}$C-NMR spectrum of fully biomass-based bis(4-allyl-2-methoxyphenyl)furan-2,5-dicarboxylate in Example 1 of this invention. As shown in this figure, the peaks at 139.79 ppm and 116.46 ppm represent carbon atoms of allyl groups of fully biomass-based allyl compound.

As shown in FIG. 5, it is high resolution mass spectrometry of fully biomass-based bis(4-allyl-2-methoxyphenyl)furan-2,5-dicarboxylate in Example 1 of this invention. Its theoretical molecular weight [M] is 448.1522, the theoretical value of [M+Na$^+$] is 471.1414, which is good agreement with the experimental value (471.1402).

Based on above figures, it is reasonable to state that the expected fully biomass-based allyl compound bis(4-allyl-2-methoxyphenyl)furan-2,5-dicarboxylate is synthesized in Example 1 of this invention.

Example 2

1) Synthesis of 2,5-furan Dicarboxylic Acid Chloride 31.20 g 2,5-furandicarboxylic acid, 35.69 g thionyl chloride and N,N-dimethyl-formamide (DMF, catalyst, 0.05 mL) are mixed; the reaction is carried out for 3 h at 80° C. with stirring, and then the mixture is naturally cooled to room temperature. After removing the thionyl chloride under reduced pressure and drying, 2,5-furan dicarboxylic acid chloride is obtained, its yield is 99.5%.

2) Synthesis of Fully Biomass-based bis(4-allyl-2-methoxyphenyl)-furan-2,5-dicarboxylate 32.84 g eugenol and 27.33 g triethylamine acting as base are dissolved in 300 mL dichloromethane; at the temperature within the range of −2.5±1° C., 2,5-furan dicarboxylic acid chloride (19.30 g) is dissolved in 300 mL dichloromethane solution to get 2,5-furan dicarboxylic acid chloride solution, which is then slowly dropped into the solution of eugenol A; After dropwise addition is completed, the reaction solution is slowly raised and maintained at 20° C. for 3 h; after the reaction is over, removing the solvent under reduced pressure, followed by washing with deionized water and drying, successively, a fully biomass-based bis(4-allyl-2-methoxyphenyl)furan-2,5-dicarboxylate is obtained, of which the yield is 91.2%.

3) Preparation of Modified Bismaleimide Resin

At 25° C., 50.0 g (139.5 mmol) N,N'-(4,4'-methylenediphenyl) dimaleimide and 44.0 g (97.65 mmol) fully biomass-based bis(4-allyl-2-methoxyphenyl)furan-2,5-dicarboxylate are mixed, the mixture is stirred for 30 min at constant temperature condition (140° C.); the prepolymer is poured into a preheated glass mold and degassed under vacuum at 145° C. for 30 min; after that, the mold is put into an oven for curing and post-curing using the procedure of 150° C./2 h+180° C./2 h+200° C./2 h and 250° C./5 h, successively; after natural cooling to room temperature, a modified bismaleimide resin is obtained.

Example 3

1) Synthesis of 2,5-furan Dicarboxylic Acid Chloride 31.20 g 2,5-furandicarboxylic acid, 35.69 g thionyl chloride and N,N-dimethyl-formamide (DMF, catalyst, 0.05 mL) were mixed; the reaction is carried out for 3 h at 70° C. with stirring, and then the mixture is naturally cooled to room temperature. After removing the thionyl chloride under reduced pressure and drying, 2,5-furan dicarboxylic acid chloride is obtained, its yield is 99.6%.

2) Synthesis of Fully Biomass-based bis(4-allyl-2-methoxyphenyl)furan-2, 5-dicarboxylate 34.48 g eugenol and 30.36 g triethylamine acting as base are dissolved in 500 mL dichloromethane; at the temperature within the range of −1±1° C., 2,5-furan dicarboxylic acid chloride (19.30 g) was dissolved in 500 mL dichloromethane solution to get 2,5-furan dicarboxylic acid chloride solution, which is then slowly dropped into the solution of eugenol A; After dropwise addition is completed, the reaction solution is slowly raised and maintained at 20° C. for 4 h; after the reaction is over, removing the solvent under reduced pressure, followed by washing with deionized water and drying, successively, a fully biomass-based bis(4-allyl-2-methoxyphenyl)furan-2,5-dicarboxylate is obtained, of which the yield is 90.6%

3) Preparation of Modified Bismaleimide Resin

At 30° C., 50.0 g (139.5 mmol) N,N'-(4,4'-methylenediphenyl) dimaleimide and 54.0 g (120.0 mmol) fully biomass-based bis(4-allyl-2-methoxyphenyl)furan-2,5-dicarboxylate are mixed, the mixture is stirred for 30 min at constant temperature condition (145° C.); the prepolymer is poured into a preheated glass mold and degassed under vacuum at 145° C. for 30 min; after that, the mold is put into an oven for curing and post-curing using the procedure of 150° C./2 h+180° C./2 h+200° C./2 h+220° C./2 h, and 240° C./4 h, successively; after natural cooling to room temperature, a modified bismaleimide resin is obtained.

Control Example 1, Preparation of 2,2'-diallyl Bisphenol A: Modified Bismaleimide Resin At 20° C., 50.0 g N,N'-(4,4'-methylenediphenyl) dimaleimide and 37.0 g 2,2'-diallyl bisphenol A are mixed, the mixture is stirred for 30 min at constant temperature condition (145° C.); the prepolymer is poured into a preheated glass mold and degassed under vacuum at 145° C. for 30 min; after that, the mold is put into an oven for curing and post-curing using the procedures of 150° C./2 h+180° C./2 h+200° C./2 h+220° C./2 h and 240° C./4 h. After naturally cooling to room temperature, a bismaleimide resin is obtained. Its differential scanning calorimetry curve of the prepolymer, the thermogravimetric curve and flexural strength of the modified bismaleimide resin are shown in FIGS. 6, 7 and 8, respectively.

Figure 6:
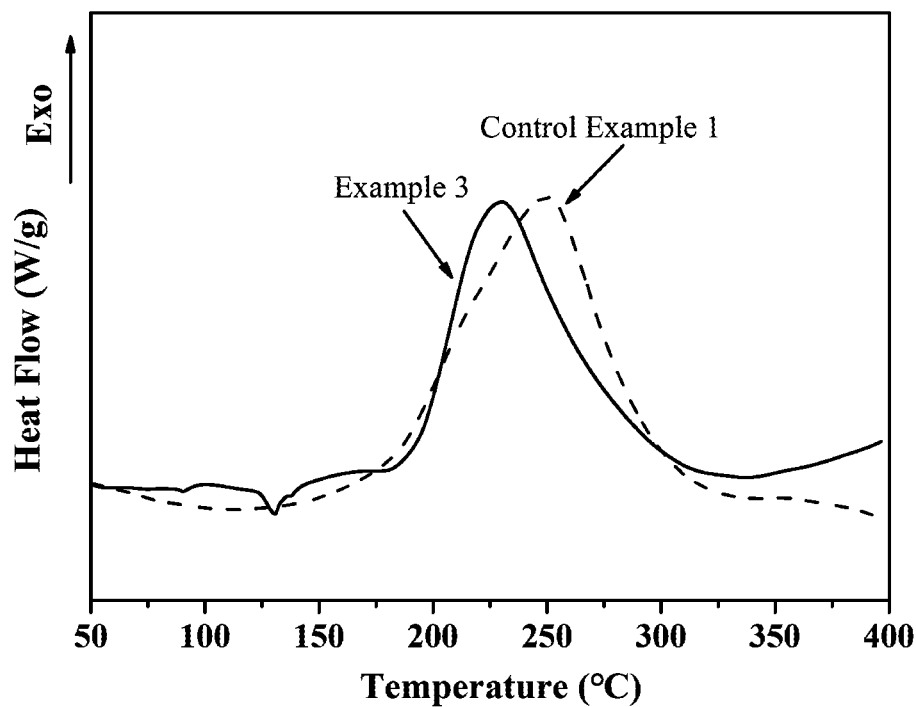
FIG. 6 is the differential scanning calorimetry curves in a nitrogen atmosphere of prepolymers of modified bismaleimide resins prepared in Example 3 and bismaleimide resin modified by 2,2'-diallyl bisphenol A prepared in Control Example 1 of this invention.

As shown in FIG. 6, it provides differential scanning calorimetry curves of the prepolymer of modified bismaleimide resin prepared in Example 3 and the prepolymer of bismaleimide resin modified by 2,2'-diallyl bisphenol A prepared in Control Example 1 of this invention. As shown in this figure, the maximum exothermic peak of the prepolymer prepared in Example 3 is 230.1° C., which is 250.2° C. lower than that of the prepolymer prepared in Control Example 1; at the same time, the activation energy of curing calculated by the Kissinger equation of modified bismaleimide resin prepolymer prepared in Example 3 is 67.5 kJ/mol, which is 72.5 kJ/mol lower than that of the prepolymer prepared in Control Example 1, indicating that the modified bismaleimide resin prepared in Example 3 has better reactivity. The reason is that allyl groups of bis(4-allyl-2-methoxyphenyl)furan-2, 5-dicarboxylate are at the para-position of the chemical structure, resulting in smaller steric hindrance.

Figure 7:
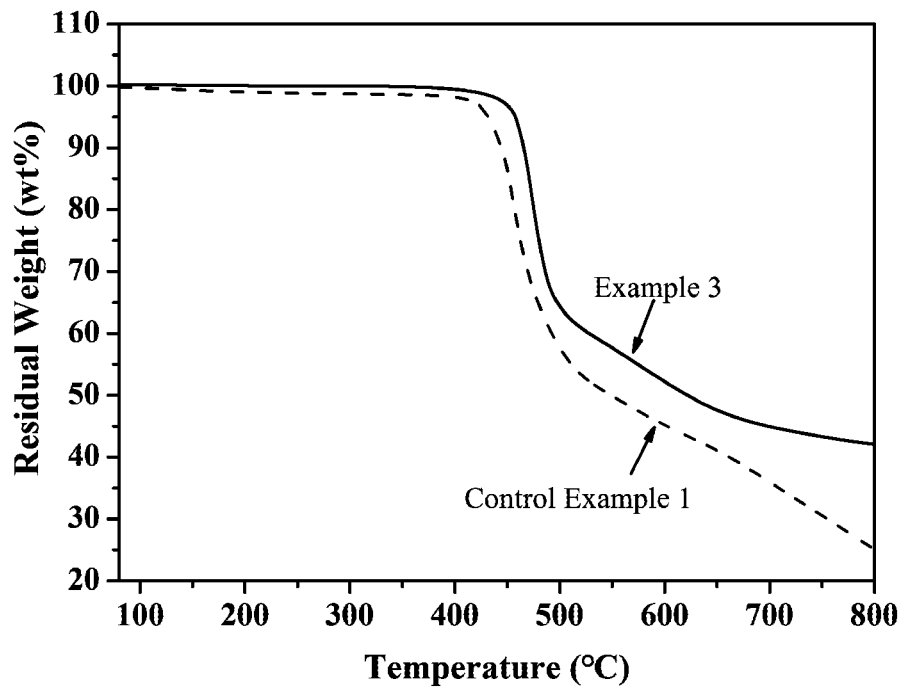
FIG. 7 is thermogravimetric curves in a nitrogen atmosphere of modified bismaleimide resin prepared in Example 3 and bismaleimide resin modified by 2,2'-diallyl bisphenol A prepared in Control Example 1 of this invention.

As shown in FIG. 7, it shows thermogravimetric curves in a nitrogen atmosphere of modified bismaleimide resin prepared in Example 3 and the bismaleimide resin modified by 2,2'-diallyl bisphenol A prepared in Control Example 1 of this invention. The initial thermal decomposition temperature ($T_{di}$) is usually used to characterize the thermo-stability of materials. As shown in the figure, $T_{di}$ of modified bismaleimide resin prepared in Example 3 is 457.5° C., which is higher than that of bismaleimide resin modified by 2,2'-diallyl bisphenol A (431.5° C.) prepared in Control Example 1, indicating that the modified bismaleimide resin prepared in Example 3 has better thermal stability. The char yield at 800° C. of the bismaleimide resin modified by 2,2'-diallyl bisphenol A prepared in prepared in Example 3 is 25.1 wt %, while the char yield at 800° C. of the modified bismaleimide resin prepared in Example 3 is as high as 42.1 wt %, this is beneficial to obtain high flame retardancy.

Figure 8:
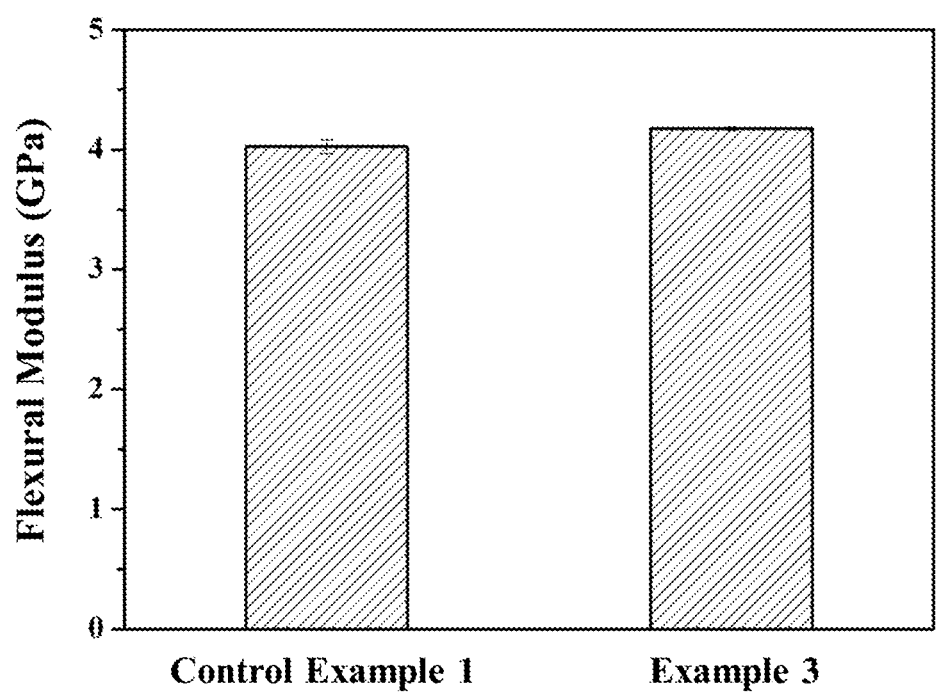
FIG. 8 is flexural strengths of modified bismaleimide resin prepared in Example 3 and bismaleimide resin modified by 2,2'-diallyl bisphenol A prepared in Control Example 1 of this invention.

As shown in FIG. 8, it gives flexural modulus of modified bismaleimide resin prepared in Example 3 and the bismaleimide resin modified by 2,2'-diallyl bisphenol A prepared in Control Example 1 of this invention. As shown in the figure, the flexural modulus of modified bismaleimide resin prepared in Example 3 is 4.17 GPa, while that of the bismaleimide resin modified by 2,2'-diallyl bisphenol A prepared in Example 3 is 4.02 GPa. This is because the fully biomass-based allyl compound prepared in Example 3 contains furan group, which is good for imparting excellent rigidity to the modified resin.

Example 4

1) Synthesis of 2,5-furan Dicarboxylic Acid Chloride 31.20 g 2,5-furandicarboxylic acid, 35.69 g thionyl chloride and N,N-dimethyl-formamide (DMF, catalyst, 0.05 mL) are mixed; the reaction is carried out for 3 h at 70° C. with stirring, and then the mixture is naturally cooled to room temperature. After removing the thionyl chloride under reduced pressure and drying, 2,5-furan dicarboxylic acid chloride is obtained, its yield is 99.6%.

2) Synthesis of Fully Biomass-based bis(4-allyl-2-methoxyphenyl)furan-2, 5-dicarboxylate 31.20 g eugenol and 31.03 g N-ethyl diisopropylamine acting as base are dissolved in 200 mL dichloromethane; at the temperature within the range of −4±1° C., 2,5-furan dicarboxylic acid chloride (19.30 g) is dissolved in 200 mL dichloromethane solution to get 2,5-furan dicarboxylic acid chloride solution, which is then slowly dropped into the solution of eugenol A; After dropwise addition is completed, the reaction solution is slowly raised and maintained at 20° C. for 2 h; after the reaction is over, removing the solvent under reduced pressure, followed by washing with deionized water and drying, successively, a fully biomass-based bis(4-allyl-2-methoxyphenyl)furan-2,5-dicarboxylate is obtained, of which the yield is 91.0%.

3) Preparation of Modified Bismaleimide Resin

At 20° C., 50.0 g (139.5 mmol) N,N'-(4,4'-methylenediphenyl) dimaleimide and 62.5 g (139.5 mmol) fully biomass-based bis(4-allyl-2-methoxyphenyl)furan-2,5-dicarboxylate are mixed, the mixture is stirred for 30 min at constant temperature condition (140° C.); the prepolymer is poured into a preheated glass mold and degassed under vacuum at 145° C. for 30 min; after that, the mold is put into an oven for curing and post-curing using the procedure of 150° C./2 h+180° C./2 h+200° C./2 h and 220° C./8 h, successively; after natural cooling to room temperature, a modified bismaleimide resin is obtained.

Example 5

1) Synthesis of 2,5-furan Dicarboxylic Acid Chloride 31.20 g 2,5-furandicarboxylic acid, 35.69 g thionyl chloride and N,N-dimethyl-formamide (DMF, catalyst, 0.05 mL) were mixed; the reaction is carried out for 3 h at 70° C. with stirring, and then the mixture is naturally cooled to room temperature. After removing the thionyl chloride under reduced pressure and drying, 2,5-furan dicarboxylic acid chloride is obtained, its yield is 99.6%.

2) Synthesis of Fully Biomass-based bis(4-allyl-2-methoxyphenyl)furan-2, 5-dicarboxylate 33.48 g eugenol and 23.73 g pyridine acting as base are dissolved in 500 mL dichloromethane; at the temperature within the range of −1±1° C., 2,5-furan dicarboxylic acid chloride (19.30 g) is dissolved in 500 mL dichloromethane solution to get 2,5-furan dicarboxylic acid chloride solution, which is then slowly dropped into the solution of eugenol A; After dropwise addition is completed, the reaction solution is slowly raised and maintained at 20° C. for 4 h; after the reaction is over, removing the solvent under reduced pressure, followed by washing with deionized water and drying, successively, a fully biomass-based bis(4-allyl-2-methoxyphenyl)furan-2,5-dicarboxylate is obtained, of which the yield is 90.8%.

3) Preparation of Modified Bismaleimide Resin

At 25° C., 50.0 g (139.5 mmol) N,N'-(4,4'-methylenediphenyl) dimaleimide and 75.0 g (167.4 mmol) fully biomass-based bis(4-allyl-2-methoxyphenyl)furan-2,5-dicarboxylate are mixed, the mixture is stirred for 30 min at constant temperature condition (145° C.); the prepolymer is poured into a preheated glass mold and degassed under vacuum at 145° C. for 30 min; after that, the mold is put into an oven for curing and post-curing using the procedure of 150° C./2 h+180° C./2 h+200° C./2 h and 250° C./5 h, successively; after natural cooling to room temperature, a modified bismaleimide resin is obtained.

Example 6

1) Synthesis of 2,5-furan Dicarboxylic Acid Chloride 31.20 g 2,5-furandicarboxylic acid, 47.59 g thionyl chloride and N,N-dimethyl-formamide (DMF, catalyst, 0.05 mL) were mixed; the reaction is carried out for 4 h at 75° C. with stirring, and then the mixture is naturally cooled to room temperature. After removing the thionyl chloride under reduced pressure and drying, 2,5-furan dicarboxylic acid chloride is obtained, its yield is 99.8%.

2) Synthesis of Fully Biomass-based bis(4-allyl-2-methoxyphenyl)furan-2, 5-dicarboxylate 31.20 g eugenol and 24.29 g triethylamine acting as base are dissolved in 200 mL dichloromethane; at the temperature within the range of −5±1° C., 2,5-furan dicarboxylic acid chloride (19.30 g) is dissolved in 200 mL dichloromethane solution to get 2,5-furan dicarboxylic acid chloride solution, which is then slowly dropped into the solution of eugenol A; After dropwise addition is completed, the reaction solution is slowly raised and maintained at 25° C. for 2 h; after the reaction is over, removing the solvent under reduced pressure, followed by washing with deionized water and drying, successively, a fully biomass-based bis(4-allyl-2-methoxyphenyl)furan-2,5-dicarboxylate is obtained, of which the yield is 91.2%.

3) Preparation of Modified Bismaleimide Resin

At 20° C., 50.0 g (139.5 mmol) N,N'-(4,4'-methylenediphenyl) dimaleimide and 35.5 g (76.73 mmol) fully biomass-based bis(4-allyl-2-methoxyphenyl)furan-2,5-dicarboxylate are mixed, the mixture is stirred for 30 min at constant temperature condition (130° C.); the prepolymer is poured into a preheated glass mold and degassed under vacuum at 145° C. for 30 min; after that, the mold is put into an oven for curing and post-curing using the procedure of 150° C./2 h+180° C./2 h+200° C./2 h and 220° C./8 h, successively; after natural cooling to room temperature, a modified bismaleimide resin is obtained.

Example 7

1) Synthesis of 2,5-furan Dicarboxylic Acid Chloride 31.20 g 2,5-furandicarboxylic acid, 47.59 g thionyl chloride and N,N-dimethyl-formamide (DMF, catalyst, 0.05 mL) were mixed; the reaction is carried out for 4 h at 75° C. with stirring, and then the mixture is naturally cooled to room temperature. After removing the thionyl chloride under reduced pressure and drying, 2,5-furan dicarboxylic acid chloride is obtained, its yield is 99.8%.

2) Synthesis of Fully Biomass-based bis(4-allyl-2-methoxyphenyl)furan-2, 5-dicarboxylate 32.84 g eugenol and 27.33 g triethylamine acting as base are dissolved in 300 mL dichloromethane; at the temperature within the range of −2.5±1° C., 2,5-furan dicarboxylic acid chloride (19.30 g) is dissolved in 300 mL dichloromethane solution to get 2,5-furan dicarboxylic acid chloride solution, which is then slowly dropped into the solution of eugenol A; After dropwise addition is completed, the reaction solution is slowly raised and maintained at 25° C. for 3 h; after the reaction is over, removing the solvent under reduced pressure, followed by washing with deionized water and drying, successively, a fully biomass-based bis(4-allyl-2-methoxyphenyl)furan-2,5-dicarboxylate is obtained, of which the yield is 91.8%.

3) Preparation of Modified Bismaleimide Resin

At 25° C., 50.0 g (139.5 mmol) N,N'-(4,4'-methylenediphenyl) dimaleimide and 44.0 g (97.76 mmol) fully biomass-based bis(4-allyl-2-methoxyphenyl)furan-2,5-dicarboxylate are mixed, the mixture is stirred for 30 min at constant temperature condition (140° C.); the prepolymer is poured into a preheated glass mold and degassed under vacuum at 145° C. for 30 min; after that, the mold is put into an oven for curing and post-curing using the procedure of 150° C./2 h+180° C./2 h+200° C./2 h and 250° C./5 h, successively; after natural cooling to room temperature, a modified bismaleimide resin is obtained.

Example 8

1) Synthesis of 2,5-furan Dicarboxylic Acid Chloride 31.20 g 2,5-furandicarboxylic acid, 47.59 g thionyl chloride and N,N-dimethyl-formamide (DMF, catalyst, 0.05 mL) are mixed; the reaction is carried out for 4 h at 75° C. with stirring, and then the mixture is naturally cooled to room temperature. After removing the thionyl chloride under reduced pressure and drying, 2,5-furan dicarboxylic acid chloride is obtained, its yield is 99.8%.

2) Synthesis of fully Biomass-based bis(4-allyl-2-methoxyphenyl)furan-2, 5-dicarboxylate 34.48 g eugenol and 30.36 g triethylamine acting as base are dissolved in 500 mL dichloromethane; at the temperature within the range of −1±1° C., 2,5-furan dicarboxylic acid chloride (19.30 g) is dissolved in 500 mL dichloromethane solution to get 2,5-furan dicarboxylic acid chloride solution, which is then slowly dropped into the solution of eugenol A; After dropwise addition is completed, the reaction solution is slowly raised and maintained at 25° C. for 4 h; after the reaction is over, removing the solvent under reduced pressure, followed by washing with deionized water and drying, successively, a fully biomass-based bis(4-allyl-2-methoxyphenyl)furan-2,5-dicarboxylate is obtained, of which the yield is 90.6%.

3) Preparation of Modified Bismaleimide Resin

At 30° C., 50.0 g (139.5 mmol) N,N'-(4,4'-methylenediphenyl) dimaleimide and 50.4 g (120.0 mmol) fully biomass-based bis(4-allyl-2-methoxyphenyl)furan-2,5-dicarboxylate are mixed, the mixture is stirred for 30 min at constant temperature condition (145° C.); the prepolymer is poured into a preheated glass mold and degassed under vacuum at 145° C. for 30 min; after that, the mold is put into an oven for curing and post-curing using the procedure of 150° C./2 h+180° C./2 h+200° C./2 h+220° C./2 h and 240° C./4 h, successively; after natural cooling to room temperature, a modified bismaleimide resin is obtained.

Example 9

1) Synthesis of 2,5-furan Dicarboxylic Acid Chloride 31.20 g 2,5-furandicarboxylic acid, 47.59 g thionyl chloride and N,N-dimethyl-formamide (DMF, catalyst, 0.05 mL) are mixed; the reaction is carried out for 4 h at 75° C. with stirring, and then the mixture is naturally cooled to room temperature. After removing the thionyl chloride under reduced pressure and drying, 2,5-furan dicarboxylic acid chloride is obtained, its yield is 99.8%.

2) Synthesis of Fully Biomass-based bis(4-allyl-2-methoxyphenyl)furan-2,5-dicarboxylate 31.20 g eugenol and 31.03 g N-ethyl diisopropylamine acting as base are dissolved in 200 mL dichloromethane; at the temperature within the range of −4±1° C., 2,5-furan dicarboxylic acid chloride (19.30 g) is dissolved in 200 mL dichloromethane solution to get 2,5-furan dicarboxylic acid chloride solution, which is then slowly dropped into the solution of eugenol A; After dropwise addition is completed, the reaction solution is slowly raised and maintained at 25° C. for 2 h; after the reaction is over, removing the solvent under reduced pressure, followed by washing with deionized water and drying, successively, a fully biomass-based bis(4-allyl-2-methoxyphenyl)furan-2,5-dicarboxylate is obtained, of which the yield is 91.0%.

3) Preparation of Modified Bismaleimide Resin

At 20° C., 50.0 g (139.5 mmol) N, N'-(4,4'-diphenyl ether) dimaleimide and 62.5 g (139.5 mmol) fully biomass-based bis(4-allyl-2-methoxyphenyl)furan-2,5-dicarboxylate are mixed, the mixture is stirred for 30 min at constant temperature condition (140° C.); the prepolymer is poured into a preheated glass mold and degassed under vacuum at 145° C. for 30 min; after that, the mold is put into an oven for curing and post-curing using the procedure of 150° C./2 h+180° C./2 h+200° C./2 h and 220° C./8 h, successively; after natural cooling to room temperature, a modified bismaleimide resin is obtained.

Example 10

1) Synthesis of 2,5-furan Dicarboxylic Acid Chloride 31.20 g 2,5-furandicarboxylic acid, 47.59 g thionyl chloride and N,N-dimethyl-formamide (DMF, catalyst, 0.05 mL) are mixed; the reaction is carried out for 4 h at 75° C. with stirring, and then the mixture is naturally cooled to room temperature. After removing the thionyl chloride under reduced pressure and drying, 2,5-furan dicarboxylic acid chloride is obtained, its yield is 99.8%.

2) Synthesis of Fully Biomass-based bis(4-allyl-2-methoxyphenyl)furan-2,5-dicarboxylate 34.48 g eugenol and 23.73 g pyridine acting as base are dissolved in 500 mL dichloromethane; at the temperature within the range of −1±1° C., 2,5-furan dicarboxylic acid chloride (19.30 g) is dissolved in 500 mL dichloromethane solution to get 2,5-furan dicarboxylic acid chloride solution, which is then slowly dropped into the solution of eugenol A; After dropwise addition is completed, the reaction solution is slowly raised and maintained at 25° C. for 4 h; after the reaction is over, removing the solvent under reduced pressure, followed by washing with deionized water and drying, successively, a fully biomass-based bis(4-allyl-2-methoxyphenyl)furan-2,5-dicarboxylate is obtained, of which the yield is 90.8%.

3) Preparation of Modified Bismaleimide Resin

At 30° C., 50.0 g (139.5 mmol) N, N'-(4,4'-diphenyl ether) dimaleimide and 75.0 g (167.4 mmol) fully biomass-based bis(4-allyl-2-methoxyphenyl)furan-2,5-dicarboxylate are mixed, the mixture is stirred for 30 min at constant temperature condition (145° C.); the prepolymer is poured into a preheated glass mold and degassed under vacuum at 145° C. for 30 min; after that, the mold is put into an oven for curing and post-curing using the procedure of 150° C./2 h+180° C./2 h+200° C./2 h and 250° C./5 h, successively; after natural cooling to room temperature, a modified bismaleimide resin is obtained.

Example 11

1) Synthesis of 2,5-furan Dicarboxylic Acid Chloride 31.20 g 2,5-furandicarboxylic acid, 59.48 g thionyl chloride and N,N-dimethyl-formamide (DMF, catalyst, 0.05 mL) are mixed; the reaction is carried out for 5 h at 80° C. with stirring, and then the mixture is naturally cooled to room temperature. After removing the thionyl chloride under reduced pressure and drying, 2,5-furan dicarboxylic acid chloride is obtained, its yield is 99.6%.

2) Synthesis of Fully Biomass-based bis(4-allyl-2-methoxyphenyl)furan-2, 5-dicarboxylate 31.20 g eugenol and 24.29 g triethylamine acting as base are dissolved in 200 mL dichloromethane; at the temperature within the range from −5 to 0° C., 2,5-furan dicarboxylic acid chloride (19.30 g) is dissolved in 200 mL dichloromethane solution to get 2,5-furan dicarboxylic acid chloride solution, which is then slowly dropped into the solution of eugenol A; After dropwise addition is completed, the reaction solution is slowly raised and maintained at 30° C. for 2 h; after the reaction is over, removing the solvent under reduced pressure, followed by washing with deionized water and drying, successively, a fully biomass-based bis(4-allyl-2-methoxyphenyl)furan-2,5-dicarboxylate is obtained, of which the yield is 91.2%.

3) Preparation of Modified Bismaleimide Resin

At 20° C., 25.0 g (69.75 mmol) N,N'-(4,4'-methylenediphenyl) dimaleimide, 25.0 g (69.75 mmol) N, N'-(4,4'-diphenyl ether) dimaleimide and 33.5 g (76.73 mmol) fully biomass-based bis(4-allyl-2-methoxyphenyl)furan-2,5-dicarboxylate are mixed, the mixture is stirred for 30 min at constant temperature condition (130° C.); the prepolymer is poured into a preheated glass mold and degassed under vacuum at 145° C. for 30 min; after that, the mold is put into an oven for curing and post-curing using the procedure of 150° C./2 h+180° C./2 h+200° C./2 h and 220° C./8 h, successively; after natural cooling to room temperature, a modified bismaleimide resin is obtained.

Example 12

1) Synthesis of 2,5-furan Dicarboxylic Acid Chloride 31.20 g 2,5-furandicarboxylic acid, 59.48 g thionyl chloride and N,N-dimethyl-formamide (DMF, catalyst, 0.05 mL) were mixed; the reaction is carried out for 5 h at 80° C. with stirring, and then the mixture is naturally cooled to room temperature. After removing the thionyl chloride under reduced pressure and drying, 2,5-furan dicarboxylic acid chloride is obtained, its yield is 99.6%.

2) Synthesis of Fully Biomass-based bis(4-allyl-2-methoxyphenyl)furan-2,5-dicarboxylate 32.84 g eugenol and 27.33 g triethylamine acting as base are dissolved in 300 mL dichloromethane; at the temperature within the range of −2.5±1° C., 2,5-furan dicarboxylic acid chloride (19.30 g) is dissolved in 300 mL dichloromethane solution to get 2,5-furan dicarboxylic acid chloride solution, which is then slowly dropped into the solution of eugenol A; After dropwise addition is completed, the reaction solution is slowly raised and maintained at 30° C. for 3 h; after the reaction is over, removing the solvent under reduced pressure, followed by washing with deionized water and drying, successively, a fully biomass-based bis(4-allyl-2-methoxyphenyl)furan-2,5-dicarboxylate is obtained, of which the yield is 91.8%.

3) Preparation of Modified Bismaleimide Resin

At 25° C., 25.0 g (69.75 mmol) N,N'-(4,4'-methylenediphenyl) dimaleimide, 25.0 g (69.75 mmol) N, N'-(4,4'-diphenyl ether) dimaleimide and 44.0 g (97.76 mmol) fully biomass-based bis(4-allyl-2-methoxyphenyl)furan-2,5-dicarboxylate are mixed, the mixture is stirred for 30 min at constant temperature condition (140° C.); the prepolymer is poured into a preheated glass mold and degassed under vacuum at 145° C. for 30 min; after that, the mold is put into an oven for curing and post-curing using the procedure of 150° C./2 h+180° C./2 h+200° C./2 h and 250° C./5 h, successively; after natural cooling to room temperature, a modified bismaleimide resin is obtained.

Example 13

1) Synthesis of 2,5-furan Dicarboxylic Acid Chloride 31.20 g 2,5-furandicarboxylic acid, 59.48 g thionyl chloride and N,N-dimethyl-formamide (DMF, catalyst, 0.05 mL) were mixed; the reaction is carried out for 5 h at 80° C. with stirring, and then the mixture is naturally cooled to room temperature. After removing the thionyl chloride under reduced pressure and drying, 2,5-furan dicarboxylic acid chloride is obtained, its yield is 99.6%.

2) Synthesis of Fully Biomass-based bis(4-allyl-2-methoxyphenyl)furan-2,5-dicarboxylate 34.48 g eugenol and 30.36 g triethylamine acting as base are dissolved in 500 mL dichloromethane; at the temperature within the range of −1±1° C., 2,5-furan dicarboxylic acid chloride (19.30 g) is dissolved in 500 mL dichloromethane solution to get 2,5-furan dicarboxylic acid chloride solution, which is then slowly dropped into the solution of eugenol A; After dropwise addition is completed, the reaction solution is slowly raised and maintained at 30° C. for 4 h; after the reaction is over, removing the solvent under reduced pressure, followed by washing with deionized water and drying, successively, a fully biomass-based bis(4-allyl-2-methoxyphenyl)furan-2,5-dicarboxylate is obtained, of which the yield is 90.6%.

3) Preparation of Modified Bismaleimide Resin

At 30° C., 25.0 g (69.75 mmol) N,N'-(4,4'-methylenediphenyl) dimaleimide, 25.0 g (69.75 mmol) N, N'-(4,4'-diphenyl ether) dimaleimide and 54.0 g (120.0 mmol) fully biomass-based bis(4-allyl-2-methoxyphenyl)furan-2,5-dicarboxylate are mixed, the mixture is stirred for 30 min at constant temperature condition (145° C.); the prepolymer is poured into a preheated glass mold and degassed under vacuum at 145° C. for 30 min; after that, the mold is put into an oven for curing and post-curing using the procedure of 150° C./2 h+180° C./2 h+200° C./2 h+220° C./2 h and 240° C./4 h, successively; after natural cooling to room temperature, a modified bismaleimide resin is obtained.

Example 14

1) Synthesis of 2,5-furan Dicarboxylic Acid Chloride 31.20 g 2,5-furandicarboxylic acid, 59.48 g thionyl chloride and N,N-dimethyl-formamide (DMF, catalyst, 0.05 mL) were mixed; the reaction is carried out for 5 h at 80° C. with stirring, and then the mixture is naturally cooled to room temperature. After removing the thionyl chloride under reduced pressure and drying, 2,5-furan dicarboxylic acid chloride is obtained, its yield is 99.6%.

2) Synthesis of Fully Biomass-based bis(4-allyl-2-methoxyphenyl)furan-2, 5-dicarboxylate 31.20 g eugenol and 31.03 g N-ethyl diisopropylamine acting as base are dissolved in 200 mL dichloromethane; at the temperature within the range of −4±1° C., 2,5-furan dicarboxylic acid chloride (19.30 g) is dissolved in 200 mL dichloromethane solution to get 2,5-furan dicarboxylic acid chloride solution, which is then slowly dropped into the solution of eugenol A; After dropwise addition is completed, the reaction solution is slowly raised and maintained at 30° C. for 2 h; after the reaction is over, removing the solvent under reduced pressure, followed by washing with deionized water and drying, successively, a fully biomass-based bis(4-allyl-2-methoxyphenyl)furan-2,5-dicarboxylate is obtained, of which the yield is 91.0%.

3) Preparation of Modified Bismaleimide Resin

At 20° C., 25.0 g (69.75 mmol) N,N'-(4,4'-methylenediphenyl) dimaleimide, 25.0 g (69.75 mmol) N,N'-(4,4'-diphenyl ether) dimaleimide and 62.5 g (139.5 mmol) fully biomass-based bis(4-allyl-2-methoxyphenyl)furan-2,5-dicarboxylate are mixed, the mixture is stirred for 30 min at constant temperature condition (140° C.); the prepolymer is poured into a preheated glass mold and degassed under vacuum at 145° C. for 30 min; after that, the mold is put into an oven for curing and post-curing using the procedure of 150° C./2 h+180° C./2 h+200° C./2 h and 220° C./8 h, successively; after natural cooling to room temperature, a modified bismaleimide resin is obtained.

Example 15

1) Synthesis of 2,5-furan Dicarboxylic Acid Chloride 31.20 g 2,5-furandicarboxylic acid, 59.48 g thionyl chloride and N,N-dimethyl-formamide (DMF, catalyst, 0.05 mL) were mixed; the reaction is carried out for 5 h at 80° C. with stirring, and then the mixture is naturally cooled to room temperature. After removing the thionyl chloride under reduced pressure and drying, 2,5-furan dicarboxylic acid chloride is obtained, its yield is 99.6%.

2) Synthesis of Fully Biomass-based bis(4-allyl-2-methoxyphenyl)furan-2, 5-dicarboxylate 34.48 g eugenol and 23.73 g pyridine acting as base are dissolved in 500 mL dichloromethane; at the temperature within the range of −1±1° C., 2,5-furan dicarboxylic acid chloride (19.30 g) is dissolved in 500 mL dichloromethane solution to get 2,5-furan dicarboxylic acid chloride solution, which is then slowly dropped into the solution of eugenol A; After dropwise addition is completed, the reaction solution is slowly raised and maintained at 30° C. for 4 h; after the reaction is over, removing the solvent under reduced pressure, followed by washing with deionized water and drying, successively, a fully biomass-based bis(4-allyl-2-methoxyphenyl)furan-2,5-dicarboxylate is obtained, of which the yield is 90.8%.

3) Preparation of Modified Bismaleimide Resin

At 30° C., 25.0 g (69.75 mmol) N,N'-(4,4'-methylenediphenyl) dimaleimide, 25.0 g (69.75 mmol) N, N'-(4,4'-diphenyl ether) dimaleimide and 75.0 g (167.4 mmol) fully biomass-based bis(4-allyl-2-methoxyphenyl)furan-2,5-dicarboxylate are mixed, the mixture is stirred for 30 min at constant temperature condition (145° C.); the prepolymer is poured into a preheated glass mold and degassed under vacuum at 145° C. for 30 min; after that, the mold is put into an oven for curing and post-curing using the procedure of 150° C./2 h+180° C./2 h+200° C./2 h and 250° C./5 h, successively; after natural cooling to room temperature, a modified bismaleimide resin is obtained.

Example 16

1) Synthesis of 2,5-furan dicarboxylic acid chloride 31.20 g 2,5-furandicarboxylic acid, 35.69 g thionyl chloride and N,N-dimethyl-formamide (DMF, catalyst, 0.05 mL) are mixed; the reaction is carried out for 2 h at 80° C. with stirring, and then the mixture is naturally cooled to room temperature. After removing the thionyl chloride under reduced pressure and drying, 2,5-furan dicarboxylic acid chloride is obtained, its yield is 99.5%.

2) Synthesis of fully biomass-based bis(4-allyl-2-methoxyphenyl)furan-2, 5-dicarboxylate 31.20 g eugenol and 8.10 g triethylamine, 10.34 g N-ethyl diisopropylamine, and 7.91 g pyridine acting as base are dissolved in 200 mL dichloromethane; at the temperature within the range from −5 to 0° C., 2,5-furan dicarboxylic acid chloride (19.30 g) is dissolved in 200 mL dichloromethane solution to get 2,5-furan dicarboxylic acid chloride solution, which is then slowly dropped into the solution of eugenol A; After dropwise addition is completed, the reaction solution is slowly raised and maintained at 30° C. for 2 h; after the reaction is over, removing the solvent under reduced pressure, followed by washing with deionized water and drying, successively, a fully biomass-based bis(4-allyl-2-methoxyphenyl)furan-2,5-dicarboxylate is obtained, of which the yield is 91.5%.

3) Preparation of Modified Bismaleimide Resin

At 20° C., 50.0 g (139.5 mmol) N,N'-(4,4'-methylenediphenyl) dimaleimide and 35.5 g (76.73 mmol) fully biomass-based bis(4-allyl-2-methoxyphenyl)furan-2,5-dicarboxylate are mixed, the mixture is stirred for 30 min at constant temperature condition (145° C.); the prepolymer is poured into a preheated glass mold and degassed under vacuum at 145° C. for 30 min; after that, the mold is put into an oven for curing and post-curing using the procedure of 150° C./2 h+180° C./2 h+200° C./2 h and 250° C./5 h, successively; after natural cooling to room temperature, a modified bismaleimide resin is obtained.

What we claim is:
1. A preparation method of modified bismaleimide resin, characterized in comprising the following steps:
(1) by mole, mixing 100 parts of 2,5-furandicarboxylic acid, 150 to 250 parts of thionyl chloride and a catalytic amount of N,N-dimethylformamide and stirring to react at a temperature of 70 to 80° C. for 3 to 5 h, naturally cooling to room temperature, removing unreacted thionyl chloride by vacuum distillation, after drying to obtain 2,5-furodicarboxylic acid chloride;
(2) by mole, dissolving 190 to 210 parts of eugenol and 240 to 300 parts of tertiary amine in 3120 to 7800 parts of dichloromethane to obtain an eugenol solution A; at a temperature of −5 to 0° C., under stirring, dissolving 100 parts of 2,5-furodicarboxylic acid chloride in 3120 to 7800 parts of dichloromethane to obtain a solution B, then adding the solution B dropwise in said eugenol solution A, after completion of dropwise addition, heating a resulting reaction solution slowly to the temperature of 20 to 30° C., and continuing the reaction reacting for 2 to 4 h; and then removing dichloromethane under vacuum rotary evaporation, washing and drying to obtain fully biomass-based bis(4-allyl-2-methoxyphenyl)furan-2,5-dicarboxylate;

(3) by mole, at 20 to 30° C., mixing 1 part of bismaleimide with 0.55 to 1.20 parts of bis(4-allyl-2-methoxyphenyl)furan-2,5-dicarboxylate, stirring at the temperature of 130 to 145° C. to get a transparent liquid, then after curing and post-treatment to obtain the modified bismaleimide resin.

2. The preparation method of modified bismaleimide resin according to claim 1, wherein said tertiary amine is triethylamine, N-ethyl diisopropylamine, pyridine, or any combination thereof.

3. The preparation method of modified bismaleimide resin according to claim 1, wherein said bismaleimide is N,N'-(4,4'-methylenediphenyl) dimaleimide, N,N'-(4,4'-diphenyl ether) dimaleimide, or any combination thereof.

4. The modified bismaleimide resin obtained by the preparation method according to claim 1.

* * * * *